United States Patent [19]

Green, deceased et al.

[11] 4,061,011

[45] Dec. 6, 1977

[54] EXTRUSION

[75] Inventors: Derek Green, deceased, late of Aspatria, England, by Muriel Irene Green, executrix, Carlisle, England

[73] Assignee: United Kingdom Atomic Energy Authority, London, England

[21] Appl. No.: 709,710

[22] Filed: July 29, 1976

[30] Foreign Application Priority Data

Aug. 6, 1975 United Kingdom ............... 32942/75
Sept. 12, 1975 United Kingdom ............... 37674/75

[51] Int. Cl.² ........................................... B21C 23/08
[52] U.S. Cl. .......................................... 72/262; 72/264
[58] Field of Search ................. 72/262, 264, 270, 271, 72/272; 425/381.2

[56] References Cited

U.S. PATENT DOCUMENTS 3,784,339  1/1974  Springfeld ......................... 425/133.1
3,841,814  10/1974  Eckhardt ........................... 425/381.2

Primary Examiner—Lowell A. Larson
Attorney, Agent, or Firm—Larson, Taylor and Hinds

[57] ABSTRACT

A process and apparatus for the production of tube by continuous extrusion, in which material is fed to a passageway having a progressively decreasing cross-sectional area and defined by a first member rotatable relative to a second member, and a die ring co-operating with the first and second members to provide an annular extrusion path. The die ring may also be rotatable and be offset from the axis of rotation of the first member. The first member and die ring form a major part of said passageway, and the second member forms a minor part of the passageway, and the relative movement therebetween causes material fed to the passageway to be drawn along the passageway by frictional drag and to be extruded as tube through the annular extrusion path.

8 Claims, 4 Drawing Figures

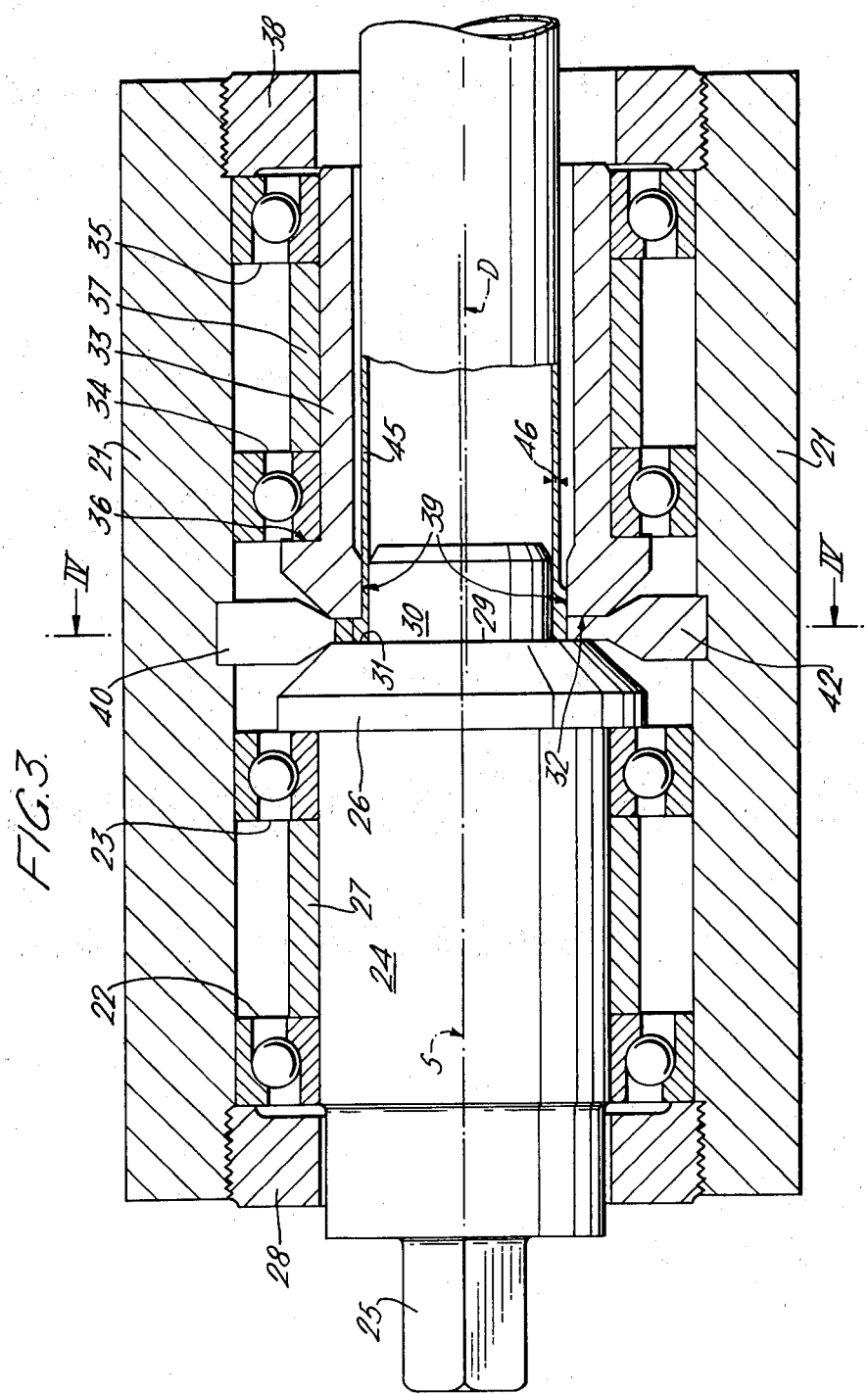

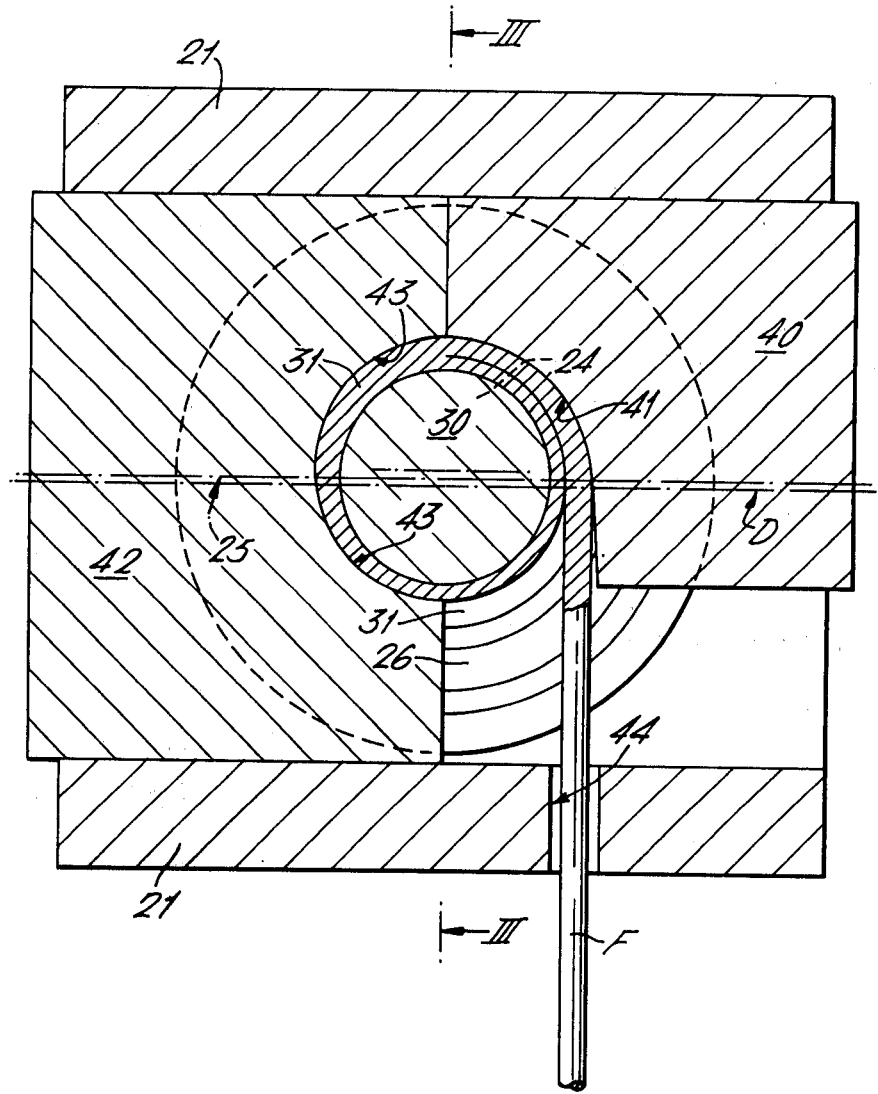

EXTRUSION

BACKGROUND OF THE INVENTION

The present invention concerns extrusion of material and particularly concerns a process and apparatus for the continuous extrusion of tube.

My British patent specification No. 1,370,894 discloses a process and apparatus for the continuous extrusion of material to provide articles in the form of rod, wire, shaped sections and tube, the tube being produced by the use of porthole or bridge dies.

It is an object of the present invention to provide a process, together with an apparatus for performing such process, for producing tube, which process is an alternative to that disclosed in the said British patent specification No. 1,370,894.

SUMMARY OF THE INVENTION

According to the present invention, a process for the production of tube by continuous extrusion comprises introducing material to be extruded into a passageway of progressively decreasing cross-section and formed between first and second members, and moving the first member and second member relatively to one another for causing the material to be drawn along the passageway by frictional drag and to be fed to and extruded through an annular extrusion path adjacent to and in communication with said passageway.

In addition, said process may also include applying to said material a regional radial compressive force which moves annularly around the extrusion path as the material moves therethrough.

Also according to the invention, apparatus for the production of tube by continuous extrusion comprises a passageway for receiving material to be extruded and having a progressively decreasing cross-sectional area and defined by a first member providing part of said passageway and being rotatable relative to a second member which provides a minor part of the passageway, and a die ring co-operating with said first and second members to provide an annular extrusion path and also forming, with that part of the passageway provided by the first member, a major part of said passageway.

The die ring may be rotatable independently of said first and second members, or alternatively may be rotatable with the first member but about an axis offset from the axis of rotation of the first member, whereby to apply to said material a regional radial compressive force which moves annularly around the extrusion path as the material moves therethrough.

In operation of said apparatus, material fed to said passageway is caused by rotation of said first member relative to said second member to be drawn along the passageway by frictional drag to cause the material to be compressed and to be extruded along said extrusion path. Where the die ring is offset as aforesaid, it exerts regional radial compression to the material being extruded, the compression region moving annularly around the material being extruded due to the eccentricity of the die ring relative to the first member.

DESCRIPTION OF THE DRAWINGS

Constructional examples embodying the invention will be described hereafter with reference to the accompanying drawings, in which FIG. 3 is a side view in section on line IV—IV of FIG. 4 and illustrates a second construction of apparatus, and FIG. 4 is an end view in section on line III—III of FIG. 3.

DESCRIPTION OF THE PREFERRED EMBODIMENTS

Figure 1:
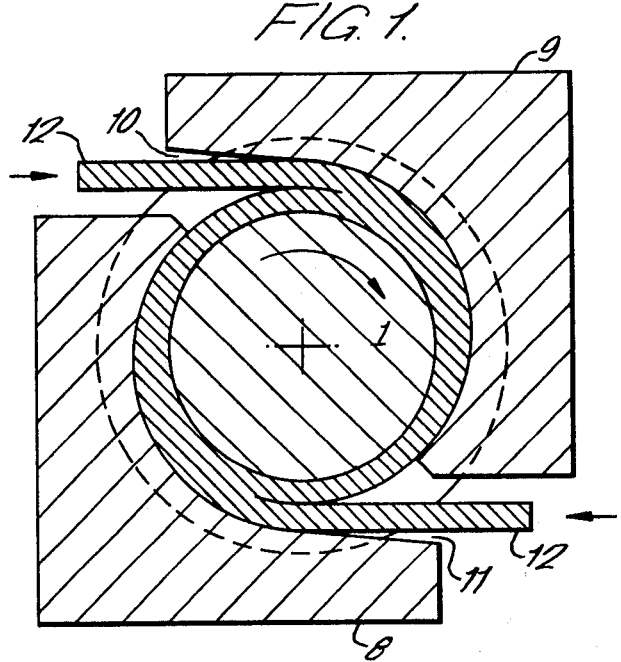
FIG. 1 is a diagrammatic end view in section on line I—I of FIG. 2 and illustrates a first construction of apparatus.
Figure 2:
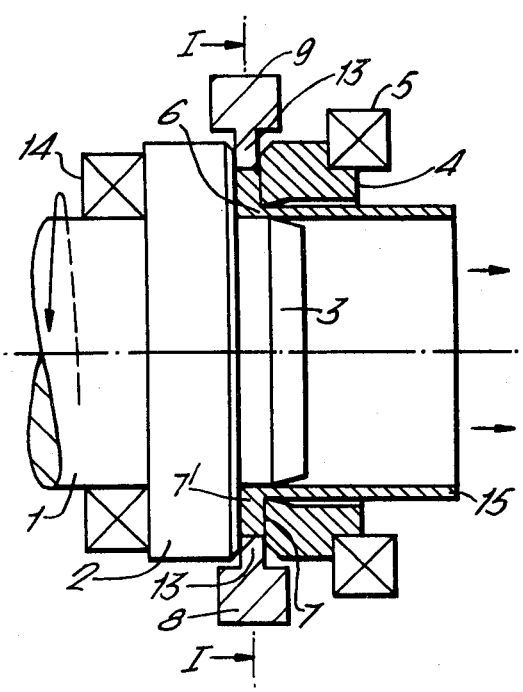
FIG. 2 is a side view partly in section of the apparatus of FIG. 1.

Referring firstly to FIGS. 1 and 2 of the drawings, in the construction shown therein of apparatus for the production of tube by continuous extrusion (the operation of such apparatus, subsequently described, will enable ready understanding of the process according to the invention as aforesaid), a rotatable drive shaft 1 is formed adjacent one end with an enlarged diameter portion 2. The portion 2 can be integral with the shaft or can be formed as a separate collar which is secured for rotation with the shaft. In the illustrated embodiment the shaft is rotated in a clockwise direction as depicted by the arrow in FIG. 1 by a drive (not shown) which is coupled to the shaft.

As shown in FIG. 2 the enlarged diameter portion 2 is spaced from the free end of the shaft which terminates in a frusto-conical part 3. This end of the shaft projects with clearance into an annular die ring 4 which is freely rotatable and supported by a thrust/radial bearing 5. The internal bore of the die ring 4 has a diameter greater than the diameter of the shaft 1 whereby to define an annular extrusion path manifest as a gap 6 therebetween. The die ring 4 is axially spaced from the portion 2 to define an annular groove 7 extending about the circumference of the shaft at its free end, the groove 7 having an annular opening at its base formed by the gap 6.

In the illustrated construction, two substantially identical fixed shoe members 8, 9 respectively, co-operate with the groove 7 to form an enclosed passageway 7' which extends around a major part of the circumference of the shaft. As shown in FIG. 1, each shoe subtends an angle approaching 180° at the centre of the shaft with the adjacent ends of the shoes being spaced apart to define openings 10 and 11 respectively for the introduction of a feed material 12 into the passageway. Each shoe member has a portion 13 having a width substantially equal to the width of the groove 7 and which projects into the groove 7 by a progressively increasing extent in the direction of rotation of the shaft 1. Consequently the cross-sectional area of the passageway 7' beneath each shoe member progressively decreases from one end to the other end thereof in the direction of rotation of the shaft 1.

A thrust/radial bearing 14 is disposed about the shaft 1 against the side of the portion 2 remote from the groove 7.

The feed material 12 can be metal rod. The feed material is fed into the openings 10 and 11 and into the passageway 7' formed beneath the shoe members 8, 9. Due to the cam-profile of the portions 13 the feed material is forced towards the bottom of the passageway 7' as it is drawn around the shaft 1. The side of the portion 2 of the rotating shaft 1 which is remote from the bearing 14 draws the material by frictional drag through the passageway 7' and the pressure build-up resulting from the material being conveyed into a progressively decreasing passageway causes the material to be extruded through the annular gap 6 in the form of a tube 15. The bore of the tube is determined by the diameter of the end portion of the shaft 1 having the part 3, and the wall thickness of the tube is determined by the width of the annular gap 6 formed between the die ring 4 and the said end portion of the shaft 1.

In the illustrated construction, the apparatus includes two diametrically opposed shoe members 8, 9 about the shaft 1. It will be appreciated that more than two shoe members can be employed and in practice it may be desirable to provide more than two shoe members, each having an associated feed inlet for the material in order to achieve a high rotational speed of the shaft and hence a high production rate of extruded tube. Equally, the apparatus can function with but one shoe member arranged to embrace the shaft and having a single inlet for feed material. The subsequently-described construction has this feature.

In the illustrated construction, the feed material 12 enters in a direction substantially normal to the axis of rotation of the shaft 1 and to the axis of the extruded tube 15, the shoes 8, 9 exerting an inwardly directed radial pressure on the feed material 12. Alternatively, it is envisaged that the feed material can be introduced substantially in the direction of the axis of rotation of the shaft and the axis of the extruded tube. In such an arrangement, not shown, an elongate shoe member can be arranged co-axially about the shaft with the shoe member having a tapered bore to define an annular cylindrical passageway about the shaft progressively decreasing in cross-section from one end of the shoe member to the other end. Feed material is coiled about the shaft and introduced into the wide end of the passageway. As the shaft is rotated the feed material is drawn along the passageway into the decreasing part thereof, causing the coils to be compacted together axially along the shaft beneath the shoe member. As the coils travel towards the narrow end of the passageway the increasing axial compaction can result in a plastic flow of the feed material which will be extruded as a tube through the annular gap at the said other end of the shoe member.

Referring now to FIGS. 3 and 4, in the construction shown therein, there is illustrated a stationary framework 21 mounting a pair of spaced ball bearings 22, 23 journalling a shaft 24 having a driving spigot 25 engageable by a prime mover (not shown) for rotating the shaft. The prime mover needs to be powerful for the purpose of continuous extrusion, a suitable example being a hydraulic motor although an electric motor may equally well be employed. The shaft 24 has a locating flange 26 for the race of the ball bearing 23, a spacing ring 27 spaces the ball bearings 22 and 23, and a retaining ring 28 screwed into the framework 21 keeps the assembly in correct positional relationship.

The flange 26 provides a shoulder 29 reducing to a portion 30 of the shaft 24 which is of reduced diameter compared with the journalled part and in fact is of a diameter corresponding to the bore of the tube it is desired to produce, i.e. the portion 30 serves as a mandrel. As well as serving as a mandrel, the portion 30 provides the floor of a passageway 31 one wall (the left hand wall in FIG. 3) of which is provided by the shoulder 29. The shoulder 29 and mandrel 30 correspond to the first member aforesaid. The other wall (the right hand wall in FIG. 3) of the passageway 31 is formed by the end surface 32 of a die ring 33 journalled in the framework 21 by a pair of spaced ball bearings 34, 35 and positioned by having a shoulder 36 locating with ball bearing 34, by a spacer ring 37, and by a retaining ring 38 screwed into the framework 21. The axis of rotation of the die ring 33 (designated D in FIG. 3) is however offset by a small amount from the axis of rotation of the shaft 24 (designated S in FIG. 3). The end region of the die ring 33 which includes the end surface 32 is formed so as to provide an annular gap 39 forming an annular extrusion path or die orifice, whose axis is the offset axis D.

The passageway 31 is completed by a stationery shoe member in two parts 40, 42 (the shoe member corresponding to the second member aforesaid) having portions 41, 43 respectively which each have a width substantially equal to and which project into, the passageway 31 formed by the shoulder 29, the end surface 32 and the mandrel 30. The portions 41, 43 are formed so that they project into the passageway 31 by a progressively increasing extent in the direction of rotation of the shaft 24. Consequently the cross-sectional area of the passageway 31, of which the portions 41, 43 form the roof, progressively decreases from one end to the other in the direction of rotation of the shaft 24, see particularly FIG. 4. This Figure also demonstrates that the portion 41 of the shoe member part 40 extends for an angular amount of about 90° and provides a part of the passageway 31 in which initial compression of the material takes place, and that the portion 43 of the other part 42 of the shoe member extends for an angular amount of about 180° and provides both further compression and the introduction of the material to the die orifice 39, through which the material is extruded and is subjected to radial compression as subsequently described. Thus there is provided an opening through which feedstock F, which for example may be a rod of metal or a rod of compactable material in precompacted powder or granular form such as a metal powder or granules of a thermoplastics, or ceramics powder, can be introduced into the passageway 31. The framework 21 has an aperture 44 at a suitable position to permit passage therethrough of the feedstock F. The feedstock entering the passageway 31 is as stated caused to be compressed, compacted or further compacted, as the material being used dictates, all referred to inclusively herein as 'compressed', due to the decreasing cross-sectional area and is also caused to move along the passageway 31 by frictional drag of the side 29 and floor formed by 30. The rotation of the shaft 24 is transmitted via the material filling the passageway to the end surface 32 of the die member 33, and causes the latter to rotate therewith, albeit eccentrically with respect thereto. The only non-rotating part of the passageway 31 is thus its roof formed by the portions 41, 43 of the shoe member. The combination of the frictional drag and the compressive action of the descending roof of the passageway 31 together serve to extrude the compressed feedstock through the die orifice 39 formed between the die member 33 and the mandrel 30. However, the eccentric rotation of the die ring 33 relative to the mandrel 30 causes an additional compression of the material as it passes through the die orifice 39, this additional compression is manifest as a regional and radial compression travelling annularly around the die orifice as eccentric rotation of the die ring 33 at the same rotational speed as that of the mandrel 30 takes place. The result is a tube 45 whose wall thickness 46 is substantially that of the least clearance between the die orifice 39 and the mandrel 30. Extrusion to produce tubing is continuous whilst feedstock continues to be fed to the passageway 31.

In some cases (for example where slip occurs), it may prove more advantageous to drive the die ring 33 directly rather than through contact across passageway 31. In this case, the die ring 33 can be extended outwardly and driven by external gearing, for example, from the drive shaft 24 or from its prime mover, preferably at the same rotational speed as the shaft 24.

I claim:

1. A process for the production of metal tube by continuous extrusion, comprising introducing non-molten metallic material to be extruded into a passageway extending in a closed loop and, at least over the major part of its length, being of progressively decreasing cross-section and formed between first and second members, of which said first member defines a greater surface portion of said passageway than does said second member, and moving the surface of the first member along said passageway relative to the second member to cause the material to be drawn along the passageway by frictional drag of said first member and to be fed to and extruded as a tube through an annular extrusion path adjacent to and in uninterrupted communication about its full circumference with a complete circuit of the closed loop of said passageway.

2. A process according to claim 1, including applying to said material in said extrusion path a regional radial compressive force which moves annularly around the extrusion path as the material moves therethrough.

3. Apparatus for the production of metal tube by continuous extrusion, comprising a passageway for receiving non-molten metallic material to be extruded and having a progressively decreasing cross-sectional area and defined by a first member providing part of said passageway and being rotatable relative to a second member which provides a relatively minor part of the passageway, and a die ring co-operating with said first and second members to provide an annular extrusion path for extruding said material as a tube, and also forming, with that part of the passageway provided by the first member, a relatively major part of said passageway.

4. Apparatus according to claim 3, wherein the die ring is rotatable independently of said first and second members.

5. Apparatus according to claim 3, wherein the die ring is rotatable from said first member, either by being driven therewith or by frictional drive therefrom via the material being extruded.

6. Apparatus according to claim 4, wherein the die ring is rotatable about an axis offset from the axis of rotation of the first member, whereby to apply to said material in said extrusion path a regional radial compressive force which moves annularly around the extrusion path as the material moves therethrough.

7. Apparatus according to claim 3, wherein the said second member is in two parts and there are two feed positions for material to be extruded, substantially 180° angularly spaced from one another.

8. Apparatus according to claim 3, wherein the said second member is in two parts, with only a single feed position for material to be extruded.

* * * * *